US007631100B2

(12) United States Patent
Ben-Zvi et al.

(10) Patent No.: US 7,631,100 B2
(45) Date of Patent: Dec. 8, 2009

(54) SUPPORTING POINT-TO-POINT INTRACLUSTER COMMUNICATIONS BETWEEN REPLICATED CLUSTER NODES

(75) Inventors: Nir Ben-Zvi, Redmond, WA (US); Sean B. House, Seattle, WA (US); Joseph Joy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/680,590

(22) Filed: Oct. 7, 2003

(65) Prior Publication Data

US 2005/0076145 A1 Apr. 7, 2005

(51) Int. Cl.
G06F 15/16 (2006.01)
G06F 15/173 (2006.01)

(52) U.S. Cl. .................. 709/245; 709/217; 709/223; 709/238; 709/246

(58) Field of Classification Search ......... 709/223–224, 709/230, 238–240, 245–246, 217
See application file for complete search history.

(56) References Cited

U.S. PATENT DOCUMENTS

| 6,772,226 | B1* | 8/2004 | Bommareddy et al. | 709/245 |
|---|---|---|---|---|
| 6,779,039 | B1* | 8/2004 | Bommareddy et al. | 709/238 |
| 6,801,949 | B1* | 10/2004 | Bruck et al. | 709/232 |
| 6,880,089 | B1* | 4/2005 | Bommareddy et al. | 726/11 |
| 7,054,944 | B2* | 5/2006 | Tang et al. | 709/229 |
| 7,099,912 | B2* | 8/2006 | Ishizaki et al. | 709/201 |
| 7,174,390 | B2* | 2/2007 | Schulter et al. | 709/245 |
| 7,373,423 | B2* | 5/2008 | Song et al. | 709/238 |
| 2004/0049594 | A1* | 3/2004 | Song et al. | 709/238 |
| 2005/0207414 | A1* | 9/2005 | Duvvury | 370/389 |
| 2006/0041650 | A1* | 2/2006 | Luo et al. | 709/223 |
| 2006/0095499 | A1* | 5/2006 | Luciani et al. | 709/201 |
| 2006/0242290 | A1* | 10/2006 | Ishizaki et al. | 709/223 |

\* cited by examiner

*Primary Examiner*—Hussein ELchanti
(74) *Attorney, Agent, or Firm*—Lee & Hayes, PLLC (57) ABSTRACT

A system and methods for carrying out point-to-point intracluster communications between hosts is provided. The disclosed system enables communication protocol layer components of hosts within a cluster to continue to operate in a cluster mode while facilitating such point-to-point communications. Initially, address discovery provides the non-cluster mode address for a target host. Thereafter, an initiating/source host issues a message including the non-cluster mode address of the target host. A network load balancing layer, or any other suitable component within the target host, intercepts the message and substitutes a cluster address for the non-cluster mode address within the message destination field before the message is presented to the communication protocol layer of the target host.

13 Claims, 6 Drawing Sheets

| | Ethernet Source | Ethernet Destination | ARP Type | ARP Source IP | ARP Source MAC | ARP Target IP | ARP Target MAC |
|---|---|---|---|---|---|---|---|
| 600 | 02-bf-aa-bb-cc-dd | ff-ff-ff-ff-ff-ff | Request | 12.12.4.101 | 02-bf-aa-bb-cc-dd | 12.12.4.102 | 00-00-00-00-00-00 |
| 610 | 02-bf-aa-bb-cc-dd | ff-ff-ff-ff-ff-ff | Request | 12.12.4.101 | 03-bf-0c-0c-04-65 | 12.12.4.102 | 00-00-00-00-00-00 |
| 620 | 02-bf-aa-bb-cc-dd | 03-bf-0c-0c-04-65 | Response | 12.12.4.102 | 02-bf-aa-bb-cc-dd | 12.12.4.101 | 03-bf-0c-0c-04-65 |
| 630 | 02-bf-aa-bb-cc-dd | 03-bf-0c-0c-04-65 | Response | 12.12.4.102 | 03-bf-0c-0c-04-66 | 12.12.4.101 | 02-bf-aa-bb-cc-dd |
| 640 | 02-bf-aa-bb-cc-dd | 02-bf-aa-bb-cc-dd | Response | 12.12.4.102 | 03-bf-0c-0c-04-66 | 12.12.4.101 | 02-bf-aa-bb-cc-dd |

SUPPORTING POINT-TO-POINT INTRACLUSTER COMMUNICATIONS BETWEEN REPLICATED CLUSTER NODES

FIELD OF THE INVENTION

This invention generally relates to the area of computer systems. More particularly, the present invention concerns methods for communicating between hosts in a network environment. Even more specifically, the present invention relates to communications protocols used by cloned nodes to communicate within a clustered host network environment.

BACKGROUND OF THE INVENTION

As will be explained further herein below, there exists a variety of modes of operation for a set of replicated hosts in a networked cluster environment. Due to hardware compatibility problems associated with multicast modes of operation, unicast cluster mode has been generally favored in clustered host installations running MICROSOFT's network load balancing (NLB) software. When such installations operate in the unicast cluster mode, the physical address of a network interface card for each member of the cluster is a shared (same) media access control (MAC) address. Sending a packet from one cluster member to another is generally not possible because (1) the physical source and destinations match the configured MAC address on the NIC (and thus will not be sent) and (2) even if the NIC passed the packet onto the wire, the physical identity of the sender (from the point of view of the physical address) is lost because the recipient NICs cannot differentiate between individual members of the cluster based upon the source MAC address (which is the shared cluster address).

Clusters, and in particular ones comprising a set of hosts running MICROSOFT's network load balancing (NLB) software, are generally operated in a unicast mode, multicast or Internet Group Multicast Protocol (IGMP) mode. The NLB load-balancing algorithm implemented in MICROSOFT's NLB software fundamentally requires that, regardless of the mode of operation, each host receives each inbound packet. The primary objective of the three modes of operation is therefore to ensure that inbound traffic destined for the cluster is received by all members of the cluster. Sometimes this requirement precludes hosts in the cluster from directly communicating with each other.

In unicast cluster mode, each host in the NLB cluster shares a common physical network (e.g., MAC) address referred to herein as a cluster address. This prohibits hosts within the cluster from communicating with each other through non-broadcast messages. This limitation arises because each host shares the same physical MAC address, which prevents TCP/IP layers within the hosts from distinguishing hosts (and their associated messages) using the physical MAC addresses.

In multicast mode, each host in an NLB cluster retains its unique physical network address but shares a common multicast MAC address called the cluster MAC address. All inbound packets are addressed to the shared multicast cluster MAC address which, in and of itself, ensures that they are "flooded" by the switch to all members of the cluster (switches inherently flood multicast and broadcast traffic to all switch ports). Furthermore, in multicast mode, unlike in unicast mode, because each host retains a unique MAC address, hosts are able to communicate amongst themselves freely. Thus, multicast mode would appear to be a preferable mode of operation in an NLB cluster where point-to-point intracluster communications support is desired. The multicast mode, however, does not work seamlessly with all routers and switches. With regard to mapping logical (e.g., IP) addresses to physical (e.g., MAC) addresses, a task associated with the well known Address Resolution Protocol (ARP), some routers and switches reject the ARP mapping of a unicast IP address to a multicast MAC address. Most routers will allow a static ARP entry of this nature to be configured, which solves the issue at hand, but necessitates manual network configuration. It is further noted that such hurdles to logical/physical address matching are likely to be encountered in other physical address discovery/matching protocols such as Neighbor Discovery associated with IP version 6.

The IGMP multicast mode is very similar to multicast mode. However, in IGMP multicast mode the multicast MAC address assigned as the cluster MAC address is an Internet Group Multicast Protocol (IGMP) address. Each NLB host within a cluster periodically sends an IGMP JOIN message to the switch to which it is connected to advertise its membership in an IGMP group. The advantage of configuring IGMP is that if the switch to which the cluster hosts are connected supports IGMP, then it will ensure that inbound packets directed to the cluster MAC address are "flooded" only on the switch ports to which cluster hosts are connected and not to all ports on the switch. The IGMP multicast mode, however, suffers from the same router and switch compatibility limitation as multicast mode.

Due to the aforementioned hardware compatibility problems associated with both multicast modes of operation, unicast mode continues to dominate the existing MICROSOFT NLB software install base. Nevertheless, circumstances arise where replicated host nodes would preferably communicate directly with each other. In cases where replicated hosts are operating in a unicast mode, such direct communication can occur if each host includes a second network card, associated with a separate communications protocol stack operating in a non-cluster mode, to which a non-cluster physical address is assigned. However, requiring a second network card to support the limited circumstances under which two replicated host nodes wish to communicate directly is generally considered both unreasonable and/or undesirable by customers.

SUMMARY OF THE INVENTION

The present invention comprises enhancements to components of clustered hosts to facilitate intracluster communication between hosts that are otherwise operating in a cluster mode. More particularly, a method and system are described for conducting physical address discovery that facilitates point-to-point communications between hosts of a cluster operating in a cluster mode. In such mode, by way of example, messages acceptable to a transport protocol layer of each host are addressed to a shared cluster address for the hosts within the cluster.

The physical address discovery method includes initially receiving an address discovery request initiated by a source host seeking a physical address of a target host within the cluster. Thereafter, upon detecting the intracluster nature of the discovery request, an address discovery response is generated that is acceptable by the source host. The discovery response includes a response source physical address field specifying a non-cluster mode physical address of the target host.

Thereafter, intracluster messages are directed by the source to the target host using the non-cluster mode physical address of the target host. In an embodiment of the invention, the target host performs address substitution, replacing the non-cluster mode physical address by the shared cluster address, prior to presenting the intracluster message to a network communication protocol-specific layer to ensure acceptance of the message.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

In the illustrative embodiments of the present invention disclosed herein, the inability of individual clustered servers to communicate on a point-to-point basis with another clustered server, a limitation of the unicast cluster mode of operation of a set of clustered servers, is overcome through recognition of intracluster packets directed to a particular cluster member. Lower layer components, such as network load balancing layers within clustered hosts, upon detecting such packets perform address substitutions. Such substitutions provide point-to-point intracluster communications capabilities without affecting/changing the unicast mode of operation of transport (e.g., TCP/IP) layer components within the hosts.

The exemplary embodiment of the present invention exposes, to a transport layer within clustered hosts, via address discovery (e.g., ARP) requests, the dedicated multicast MAC addresses of clustered hosts that correspond to their dedicated IP addresses. This, in turn, avoids a necessity for lower layer components to alter the destination MAC address of many packets/frames during point-to-point intracluster communications. The address discovery requests and responses are modified prior to presenting the packets to the TCP/IP layer of hosts to avoid rejection of the packets by the TCP/IP layer within each host, which continues to operate in a unicast cluster mode and only accepts packets addressed to the cluster address.

As will be explained further herein below with reference, by way of example, to a cluster operating under IPv4, the TCP/IP layer of the clustered hosts learns the dedicated multicast MAC addresses associated with the dedicated IP addresses of each host, through modifications to the ARP payloads in several stages of address discovery. First, when an intracluster ARP request arrives for the dedicated IP address of the local host upon which an NLB component resides, the NLB component overwrites the source MAC address in the ARP payload with the corresponding dedicated multicast MAC address of the local host. This substitution results in the local host adding an entry, including the dedicated IP address and dedicated multicast MAC address mapping of the initiating host, to the local ARP table.

The response from the TCP/IP layer of the local host includes the source MAC address of the ARP request, the appropriate dedicated multicast MAC address of the discovery request source, as the destination MAC address of the response, eliminating the need for NLB to overwrite it to ensure its reception by the initiating host. However, both MAC addresses in the ARP payload are modified to (1) notify the initiating host of the dedicated MAC address of the local host and (2) ensure that the TCP/IP layer of the initiating host, operating in unicast cluster mode, accepts the response packet.

Upon receiving the response, the NLB layer of the initiating host masks the destination address (e.g., inserts the cluster address) of the response before passing it to the TCP/IP layer, which operates in unicast cluster mode and would reject a response containing the non-recognized dedicated physical address of the receiving host.

Upon completing address discovery, the TCP/IP layers in both initiator and responder hosts insert a dedicated multicast MAC address within the destination field of their packets addressed to cluster members for which the above-described address discovery procedure has been performed. The NLB layer within each of the hosts is configured to detect such packets and substitute the cluster address for the dedicated MAC address in the destination field prior to passing the packets to the TCP/IP layer which operates in a unicast mode and would reject packets specifying a dedicated multicast address because the TCP/IP layer is not aware of the local dedicated MAC address. Thus, the TCP/IP layer mode of operation need not be changed to facilitate point-to-point intracluster communications.

Handling ARP requests from cluster members in this special manner prevents non-cluster members from acquiring address mappings between dedicated IP and physical addresses for specific hosts within a cluster. In particular, such mappings are protected because if the ARP request does not originate from another cluster member, then the physical (MAC) address is not modified and the response contains the cluster address. Thus, cluster members will map a host's dedicated IP address to a corresponding multicast mode MAC address, while non-cluster members will map a host's dedicated IP address to the unicast mode cluster MAC address shared by all cluster members.

Figure 1:
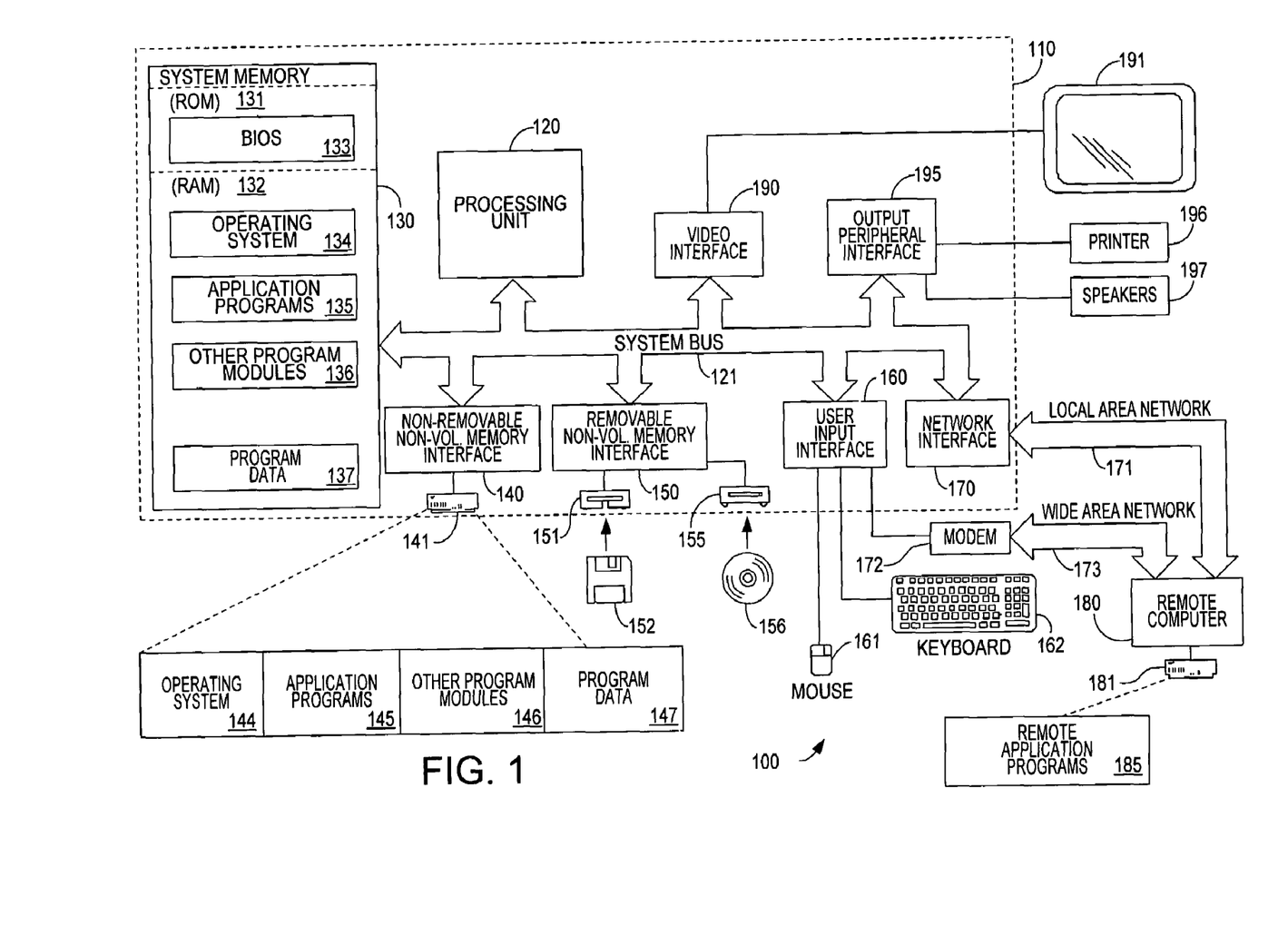
FIG. 1 is a simplified schematic illustrating an exemplary architecture of a computing device for carrying out a host capable of carrying out an intracluster address discovery and point-to-point communication method in accordance with an embodiment of the present invention.

FIG. 1 illustratively depicts an example of a suitable operating environment 100 for replicated host nodes within a cluster that embody the present invention. The operating environment 100 is only one example of a suitable operating environment, for the replicated nodes of a cluster, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention is potentially incorporated into a variety of network load balanced host cluster configurations wherein the host nodes are operating in a unicast mode. In the unicast mode, each clustered host shares a common physical network address, referred to herein generally as a "cluster address" (e.g., a cluster MAC address). Thus, while operating in the unicast mode, the clustered hosts receive packets designating the shared cluster physical address. While operating in the unicast mode, messages are addressed to, and accepted by, the clustered host nodes. Higher level software within each node subsequently determines how to process the message, including possibly discarding the message. However, since each host within the cluster is addressed by a same physical network address, a host cannot send a message to another particular host in the network without broadcasting the request to all hosts in the cluster. Furthermore, in some systems a message addressed to the cluster address by a cluster member is intercepted and "looped back" to the sender without transmitting the message on the network—and therefore none of the other cluster members will even receive the message. Thus operating in the unicast/cluster mode prevents non-broadcast communications between hosts within a cluster (sharing a common cluster MAC address).

Figure 2:
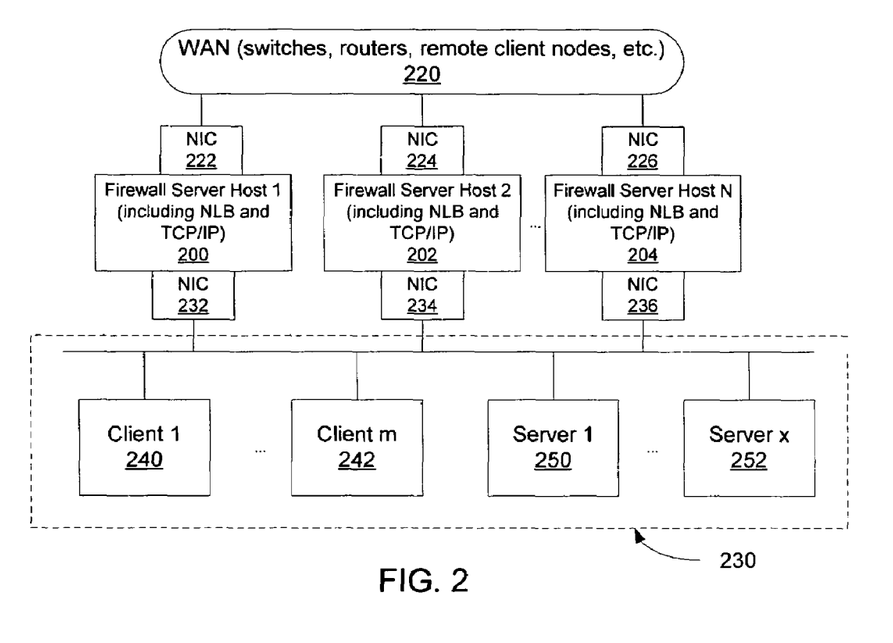
FIG. 2 is an exemplary network arrangement including a set of clustered servers wherein an illustrative embodiment of the present invention is advantageously incorporated.

FIG. 2 presents one such host cluster arrangement for purposes of describing an exemplary embodiment of the invention. In this particular illustrative embodiment, a cluster of firewall server hosts are interposed between a wide area network (e.g., the Internet) and a local area network comprising multiple client and server nodes. Those skilled in the art will appreciate, in view of the disclosure provided herein, the wide variety of potential network arrangements (and host cluster types) in which the present invention is applicable. For example, in a basic arrangement wherein the present invention is potentially incorporated, a cluster of cloned hosts reside on a single network (i.e., each host has a NIC that interfaces each host to a same network).

In the exemplary host cluster network configuration set forth in FIG. 2, a cluster of N network load balanced firewall server host applications, comprising Host 1 200, Host 2 202, and Host N 204, execute upon a set of server machines connected to a wide area network (WAN) 220 via network interface cards (NICs) 222, 224 and 226, respectively. The WAN 220, by way of example, comprises the Internet. While not depicted in FIG. 2 it will be appreciated by those skilled in the art that WAN 220 includes routers, switches, remote client nodes, other servers (both clustered and non-clustered), peers, etc. with which the clustered firewall hosts 200, 202, and 204 regulate/monitor communications on behalf of clients 240, . . . , 242 and servers 250, . . . , 252 residing on a local area network (LAN) 230. The Hosts 200, 202 and 204 interface the LAN 230 via NICs 232, 234 and 236, respectively.

The individual members of the load balanced firewall server cluster, comprising Host 1 200, Host 2 202, . . . and Host N 204, are generally transparent to the other nodes on the WAN 220. In other words, the quantity and individual identities of the servers making up the firewall server cluster is unknown by the network entities with which the members of the firewall server cluster communicate. As a consequence, individual network entities on the WAN 220, including the Hosts 200, 202 and 204, are unable to address/direct packets to any particular one of the network nodes upon which the clustered servers operate (unless provided a dedicated IP address of a particular host). Furthermore, due to the presence of identical source and destination hardware addresses within intra-cluster messages when operating in a cluster mode, members of clusters cannot generally send messages to other members of the cluster (without resorting to broadcasting a message).

Cluster member transparency on the WAN 220 is achieved by operating the firewall servers on the clustered Hosts 1-N in the aforementioned unicast mode. While operating in a unicast mode, the TCP/IP layer within each of the clustered firewall hosts accepts packets having a destination address identifying the shared hardware cluster address. In the illustrative example set forth in FIG. 2, the cluster address corresponds to a cluster MAC address assigned to NICs 222, 224 and 226. Network load balancing (NLB) components within the Hosts 200, 202 and 204 filter the requests based upon additional information provided in the request (e.g., an Internet Protocol address).

In an embodiment of the invention, each of the N NICs 222, 224, . . . , 226 connected to the WAN 220 also possesses a dedicated (unique) physical address—and more particularly, a dedicated multicast MAC address. However, to ensure that the functionality of network load balancing is achieved (i.e., that network routers do not learn a unicast IP address to multicast MAC address mapping), the Hosts 200, 202, . . . , and 204 designate a cluster MAC address within the network source field of transmitted address discovery request/response packets. Transmitting a dedicated multicast MAC address within the source field of an address discovery request would potentially enable an intelligent switch/router in the WAN 220 to associate a particular hardware address with the host that issued the request and thereby potentially cause communication disruption to that host.

Notwithstanding the masking of specific host sources in messages issued by clustered hosts through cluster addressing, in an embodiment of the invention functionality is incorporated into the NLB layer of each clustered host (e.g., Hosts 200, 202 and 204) enabling each host to determine, via address discovery requests, dedicated physical (e.g., multicast MAC) addresses assigned to the other hosts within the cluster. Thereafter, whenever a host within a cluster utilizes a dedicated multicast address as the destination address in a message sent to another host within the cluster, substitution logic within the NLB layer of the receiving host replaces the dedicated multicast address by the unicast-mode cluster address for the host cluster prior to passing the request to the TCP/IP layer of the indicated host. While messages passed between two hosts within a cluster include a dedicated multicast destination address, the destination address of the messages processed by the TCP/IP layer of the destination host is the shared cluster address of the cluster to which the source and destination hosts belong. Thus, a cluster host is able to receive a specifically (e.g., dedicated multicast) addressed message from another host within a cluster without leaving its unicast mode of operation. It is further noted that while the NLB layer carries out the above-described address substitution in clustered hosts, in alternative embodiments of the invention this functionality is carried out by any of a variety of components interposed between the NIC and a higher level communications protocol layer that generates responses to an address resolution request.

In an embodiment of the invention, each of the Hosts 200, 202, and 204 is assigned a unique Internet Protocol (IP) address. The IP addresses are utilized by the clustered hosts to identify messages/requests from other members of the cluster and for individually connecting to a particular server by a network entity that is not a member of the cluster. In an embodiment of the invention, each host within a cluster maintains a set of address values corresponding to the unique IP addresses assigned to the hosts within its cluster. The set of cluster host IP addresses enables the NLB layer (or any other suitable intermediate communications processing component below the TCP/IP layer including, for example, network security components) to recognize and appropriately modify/replace addresses within the messages/requests from other cluster members—such as the aforementioned address discovery requests—in accordance with an embodiment of the present invention. An exemplary method/infrastructure for carrying out such address replacement is described herein below.

The method by which the Hosts 200, 202 and 204 receive/discover the IP addresses of the cluster members differs in alternative embodiments of the invention. The IP address of a host within a cluster is dynamically assignable. In an embodiment of the invention implementing IP version 4 (IPv4), a heartbeat-based protocol notifies each cluster member of the dedicated IP addresses on a repeated basis to ensure that the set of addresses remains up-to-date. Alternatively, the set of IP addresses for each of the cluster members is provided during configuration (e.g., manually by an administrator or alternatively by automated configuration mechanisms).

Each of the Hosts 200, 202 and 204 accumulates IP address-to-physical machine address mapping information for networked entities to which they intend to initiate communications over the WAN 220. Such mapping information is obtained, by way of example, via the aforementioned address discovery requests. In a particular embodiment of the invention, the discovered dedicated multicast address information is stored within an Address Resolution Protocol (ARP) table maintained by a TCP/IP layer component executing within the host machines. The ARP table, upon successful completion of an ARP request to a clustered host, includes an entry pairing an IP address of the clustered host with a corresponding dedicated (i.e., unique) multicast address.

In accordance with an illustrative embodiment of the invention (described herein below), a clustered host utilizes an ARP request, including the IP address of another host within the cluster, to discover the dedicated multicast address of the other host. However, such dedicated multicast MAC addresses can also be provided for each of the cluster hosts during configuration (either manually or through automated mechanisms). In another embodiment of the invention, utilizing IPv6 rules, "neighbor discovery" is utilized to notify clustered hosts of the IP and dedicated multicast MAC addresses of the other cluster members.

Alternatively, each host automatically generates IP to machine address mappings without submitting requests to the other clustered hosts. Instead each of the clustered hosts generates a set of dedicated multicast addresses corresponding to the other cluster members using a set of known IP addresses and a provided address mapping function. In such case, the address discovery (e.g., ARP) requests issued by the TCP/IP layer of a host are handled, for example, by the NLB layer executing on the same host. However, such arrangement has the effect of masking the actual status of a clustered host to which the address discovery request is directed (such as whether the target host exists, is functioning properly, etc.). Furthermore, in other instances, a host may discard messages that identify a source from which it did not previously receive an address discovery request.

Finally, it is noted that the dedicated multicast MAC address assigned to each cluster hosts need not be dedicated/unique. Instead, in an embodiment of the invention one or more hosts within a cluster share a same intracluster multicast MAC address. In such instances, intracluster host messages are filtered in accordance with, for example, an IP address assigned to the intended recipient host. Packets that are not intended for a particular host within the cluster are filtered by the NLB layer of the receiving host.

Having generally described an exemplary network and clustered host arrangement suitable for carrying out the present invention, attention is directed to FIGS. 3-7 that summarize and depict an exemplary sequence of steps performed by two clustered hosts to carry out dedicated multicast address discovery, and thereafter support dedicated multicast destination addressing in messages passed between the two hosts. In the exemplary embodiment, ARP requests are utilized to establish the dedicated multicast addresses of the clustered hosts.

Figure 3:
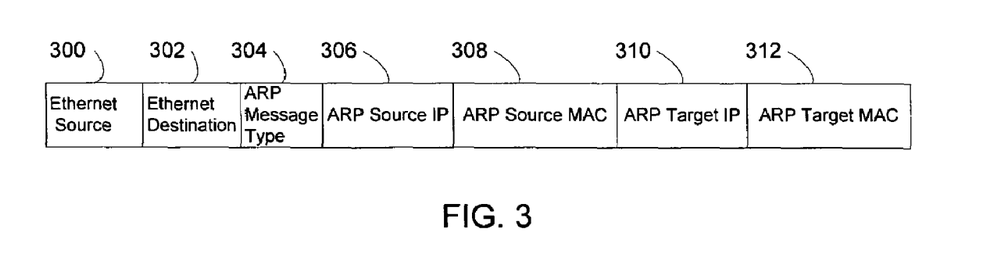
FIG. 3 is a schematic drawing depicting a set of fields within an exemplary address discovery packet.

Turning initially to FIG. 3, a set of fields are identified that correspond to portions of an ARP packet used in implementing the present invention. Such fields are well known, and are provided as a reference for the description of the steps summarized/depicted in FIGS. 4-7. The first two fields relate to hardware addresses within transmitted packets. An Ethernet source field 300 of the ARP packet designates a network hardware address of a packet source. The source hardware address can be any of a variety of address types including a multicast or a unicast address type. An Ethernet destination field 302 designates a network hardware address for a receiver of the ARP packet. The destination hardware address can be any of a variety of address types including a multicast, a unicast, or a broadcast address type.

The remaining fields constitute a combination of fields supporting hardware (e.g., MAC) address discovery in a network. An ARP type field 304 designates whether the ARP packet is an ARP request or response. An ARP Source IP address field 306 specifies an Internet Protocol address assigned to the source of the ARP message. In the illustrative embodiment of the invention the ARP Source IP address field 306 (and potentially other fields, such as a source MAC address field 308) is utilized by the NLB layer of a receiving host to identify packets from other member hosts of a cluster. At least the content of the Source IP address field 306 triggers address replacement logic within the NLB layer of a receiving clustered host. By way of example, the address replacement logic is invoked when the source IP address matches one of a set of IP addresses, assigned to members of the cluster, that is maintained by the receiving host and a hardware address within an ARP Source MAC address field 308 is the shared MAC address assigned to the cluster. The ARP Source MAC address field 308 specifies a hardware address assigned to the source of the ARP packet.

In the illustrative embodiment of the present invention the NLB layer in a recipient host substitutes a multicast address for a unicast address within the ARP Source MAC address field 308 before (1) sending the address discovery request packet up to the TCP/IP layer (enabling updating the ARP table of the recipient host with a multicast address of the requesting host) and (2) sending the response packet back to the NIC for transmission back to the requesting host (enabling updating the ARP table of the requesting host with a multicast address of the recipient host).

The ARP packet also includes a set of fields identifying a target (i.e., destination) of an ARP request/response. An ARP Target IP address field 310 specifies an Internet Protocol address assigned to the intended destination of an ARP message. An ARP Target MAC address field 312 specifies the hardware address of the intended destination of an ARP packet. The TCP/IP layer of a clustered host that receives an ARP request fills the ARP Target MAC address field 312 of an ARP response packet with the MAC address specified in the ARP Source MAC address field 308 of a corresponding request packet. In an embodiment of the invention the NLB layer of a recipient host substitutes a multicast address for a unicast address within the ARP Source MAC address field 308 before passing the request to the TCP/IP layer. Upon receiving the ARP response packet from the TCP/IP layer, the NLB layer replaces the multicast address with a unicast MAC address in the ARP Target MAC address field 312 prior to passing the ARP response packet to the NIC. This replacement ensures acceptance of the response by the TCP/IP layer of the clustered host that originated the request. Thus, replacement of the multicast address can occur at any point before the ARP response is passed up to the TCP/IP layer of the originating host.

Figure 4:
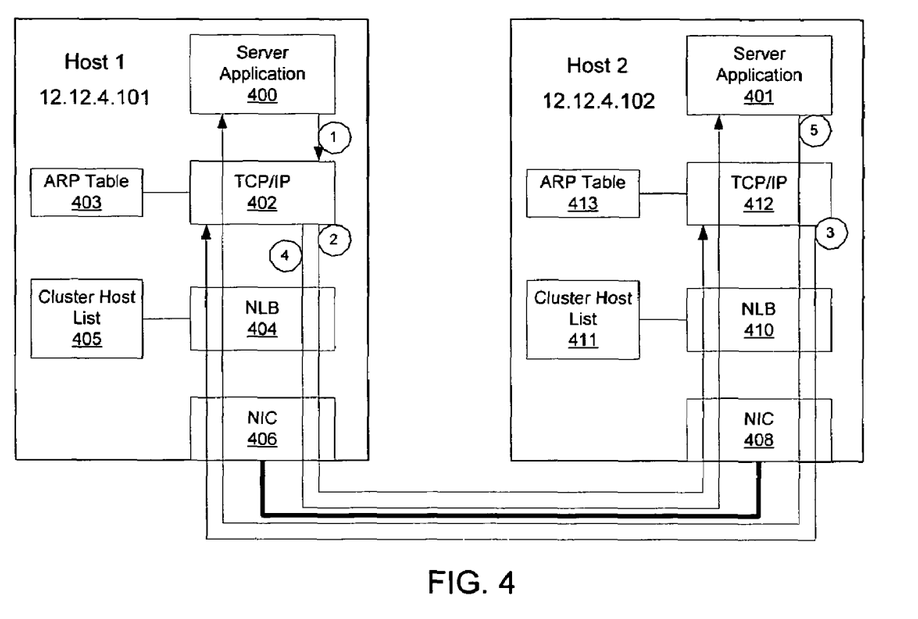
FIG. 4 depicts a portion of network including a first and second host within a host cluster and wherein each host communicates over a network line via network interface cards (NICs) having at least an associated cluster address and a dedicated (unique) physical network address.

Having described an exemplary set of address discovery packet fields and their role in carrying out an embodiment of the present invention, attention is directed to FIGS. 4-7 that summarize stages/steps for carrying out multicast address discovery between hosts within a same cluster, and subsequent use of the multicast address to submit a query and obtain a response in accordance with an embodiment of the present invention. Turning first to FIG. 4, a set of numbered arrows trace the general stages of carrying out ARP-based address discovery to obtain multicast addresses for two hosts within a cluster, and thereafter submitting a request (and receiving a response) between two hosts within a cluster operating in a unicast mode. The stages depicted in FIG. 4 resemble the typical way in which two nodes communicate in a point-to-point mode. However, such communications were not previously possible when server clusters operated in a unicast mode. In addition to tracing the aforementioned steps, FIG. 4 identifies primary components of an exemplary framework within a set of clustered nodes that facilitate host-to-host intracluster communications in accordance with an embodiment of the present invention.

Initially at Stage 1, a server application 400 on Host 1 submits an intracluster request to a TCP/IP layer 402 including the IP address for a server application 401 on Host 2. The TCP/IP layer 402 initially checks its ARP table 403 for an entry corresponding to the specified IP address of the server application 401. If the IP address is not present in the ARP table 403, then during an ARP Request Stage 2 the TCP/IP layer 402 generates and transmits an ARP request having a set of fields described herein above with reference to FIG. 3. The request passes through the NLB layer 404. As mentioned above, the NLB layer 404 maintains a cluster host list 405 that can be generated/updated in any of a variety of ways. The request passes from Host 1 via a NIC 406 and is received by NIC 408 on Host 2. The NIC 408 passes the ARP request up to an NLB layer 410. In an embodiment of the invention, the NLB layer 410 performs packet manipulation/filtration operations, including physical source address substitution, on the request (described herein below). In an embodiment of the invention, the NLB layer 410 identifies a request from another cluster member by referencing a cluster host list 411 containing the IP addresses of the hosts within the cluster. After processing the received ARP request the NLB layer 410 passes the ARP request up to the TCP/IP layer 412.

During Stage 3, the TCP/IP layer 412 processes the ARP request and returns an ARP response packet to the TCP/IP layer 402 of Host 1. During processing of the request, the TCP/IP layer 412 adds an ARP entry within an ARP Table 413 on Host 2. The ARP entry includes an IP address and corresponding physical address provided in the ARP source IP 306 and the ARP Source MAC field 308, respectively in the ARP packet passes to the TCP/IP layer 412 by the NLB layer 410.

The TCP/IP layer 412 creates the ARP response packet. The ARP Target IP 310 and ARP Target MAC 312 contain the Source address of the ARP request. The ARP Source IP 306 contains the IP address of the Host 2 (12.12.4.102). The TCP/IP layer 412 provides the physical address of Host 2 (the shared cluster MAC address) within the ARP Source MAC 308. The ARP response packet is thereafter passed down to the NLB layer 410, which performs further packet manipulation operations, including physical address substitution in the ARP Source MAC 308 (described herein below) before passing the ARP response packet to the NIC 408. The NIC 408 transmits the response to NIC 406 of Host 1. The response is thereafter passed up to the TCP/IP layer 402 via the NLB layer 404 after performing further address manipulations to ensure acceptance of the response packet by the TCP/IP layer 402—which expects the returned ARP response to designate the shared cluster address in the destination address 302 of the ARP response.

During Stage 4, the TCP/IP layer 402 processes the ARP response and then transmits the actual intracluster data/request packet to Host 2 using the physical address provided in the ARP response during Stage 3. The data/request packet passes through the NLB layer 404 and out of Host 1 via NIC 406. The data/request packet is received by the NIC 408 on Host 2 and passes up to the Server Application 401. However, in accordance with an embodiment of the invention, described herein below, the destination address is modified by the NLB layer 410, to specify the cluster address for Hosts 1 and 2, prior to passing the request up to the TCP/IP layer 412.

During Stage 5, the Server Application 401 responds to the received data/request. The response packet includes a dedicated physical address of Host 1's machine (facilitated by the previously performed steps 2 and 3 that enabled both the Host 1 and Host 2 to discover one another's dedicated multicast MAC addresses). The response packet passes back to Host 1 via the indicated path through the TCP/IP layer 412, NLB layer 410 and NIC 408. The NIC 406 receives and passes the response packet to the NLB layer 404. In accordance with an embodiment of the invention, described herein below, the destination address in the response is modified by the NLB layer 404, to specify the cluster address for Hosts 1 and 2, prior to passing the request up to the TCP/IP layer 402 and Server Application 400. Thus, an exemplary series of transmissions associated with transmitting a request and receiving a response, after initially performing address discovery to determine a physical address of another host within a cluster, have been generally described.

Figure 5:
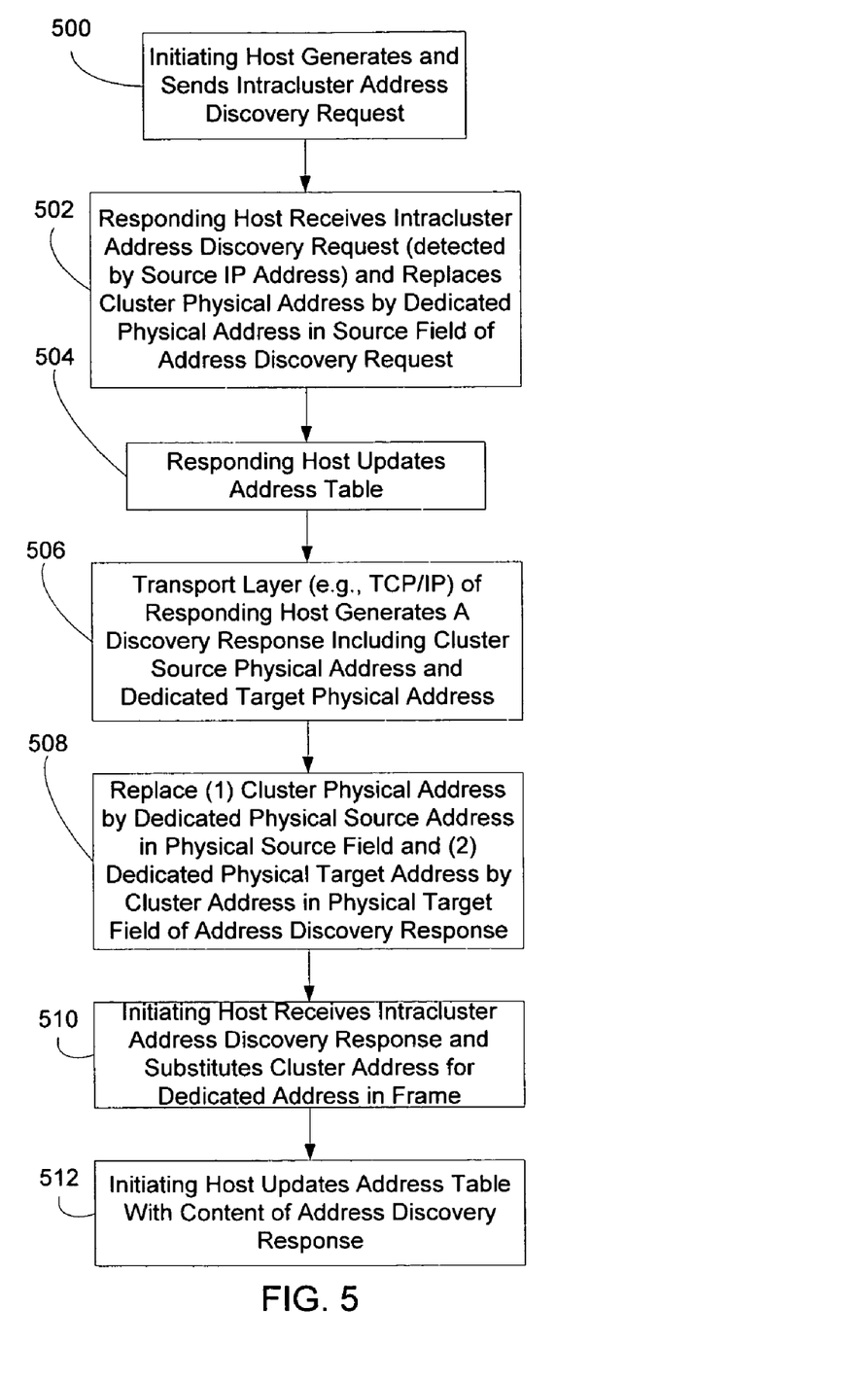
FIG. 5 is a flowchart summarizing a set of steps for carrying out intracluster physical address discovery in accordance with an embodiment of the present invention.
Figure 6:
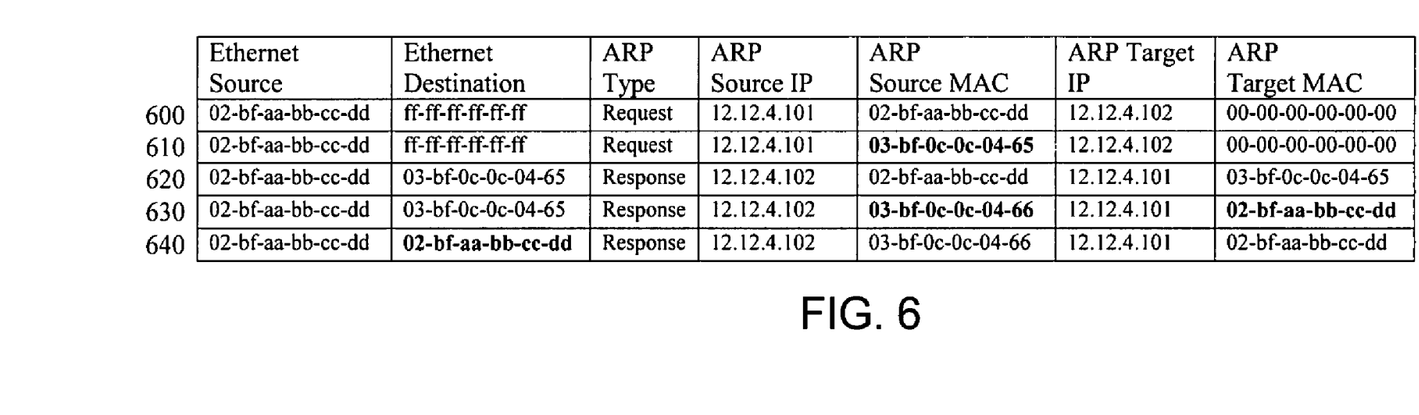
FIG. 6 is a table including a set of rows including relevant data contained within Address Resolution Protocol (ARP) packets.
Figure 7:
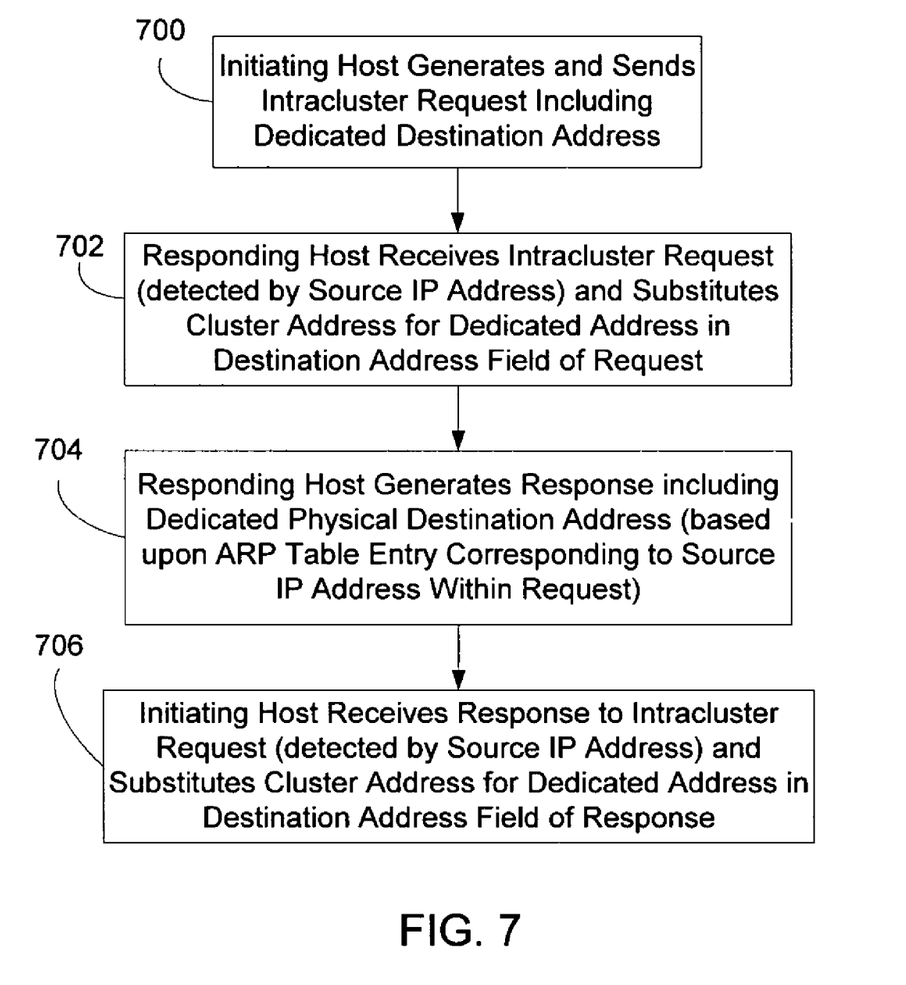
FIG. 7 is a flowchart summarizing a set of steps for carrying out intracluster point-to-point communications within a unicast cluster in accordance with an embodiment of the present invention.

Turning now to FIGS. 5, 6 and 7, the above-described steps are described in greater detail, and with reference to an exemplary set of ARP packets. In the illustrative example provided herein below, the TCP/IP layers of the clustered hosts operate in a unicast mode. However, the NLB layer utilizes dedicated physical addressing during intracluster communications to facilitate determining/discovering a dedicated physical address for a clustered host through submission of an ARP request. After receiving and storing the dedicated address of a clustered host, the host uses the dedicated address in a request/message to the discovered address. Dedicated destination physical addresses are converted into the shared cluster address by a receiving host before passing packets up to the TCP/IP layer and host application. It is further noted that it is assumed, in the following example, that the clustered hosts each possess a list of the IP addresses of the clustered hosts.

Turning to FIG. 5, during step 500 an initiating host (e.g., Host 1 of FIG. 4) generates and sends an address discovery (e.g., ARP) request including a Target IP address corresponding to another host (e.g., Host 2) within its cluster. An example of the content of such address discovery request packet is provided in row 600 of the table set forth in FIG. 6. In the exemplary embodiment of the invention, such request is created at the TCP/IP layer 402 of Host 1 and passes, unaltered, out Host 1 and is received by all potential recipient nodes of a broadcast request—specified by the Ethernet Destination address ff-ff-ff-ff-ff-ff. The ARP request packet having the content depicted in row 600 specifies a unicast cluster address (02-bf-aa-bb-cc-dd) in the ARP Source MAC field since the TCP/IP layer 402 is operating in the unicast mode. However the ARP packet payload also includes IP addresses specifically identifying the source (12.12.4.101) and target (12.12.4.102) of the ARP request.

Next, during step 502 Host 2, corresponding to the IP address specified in the ARP Target IP field of the exemplary request packet described in row 600, compares the ARP Source IP in the received request to the set of IP addresses enumerated within its cluster host list 411 (built in any of a variety of manual and automated cluster member IP address discovery methods). Upon determining that the request is indeed from another host within its cluster (as further confirmed by a shared MAC address for the cluster within the source MAC address field 308 of the ARP request payload), the receiving Host 2 replaces the unicast cluster address (e.g., 02-bf-aa-bb-cc-dd) in the ARP Source MAC field by a multicast address, and in particular a dedicated multicast address (03-bf-0c-0c-04-65). In the illustrative embodiment of the invention, the replacement ARP Source MAC address comprises a multicast MAC address prefix for the host cluster (03-bf) in combination with a hexadecimal equivalent of the four-part decimal IP address assigned to the initiating Host 1. The content of the modified ARP packet, passed to the transport layer of Host 2, is depicted in row 610 of FIG. 6.

The multicast address placed within the ARP Source MAC field of the request can take any of a variety of forms. In the illustrative embodiment of the invention, the multicast address inserted into the ARP Source MAC field specifies a dedicated physical address assigned to the NIC of the initiating host within the cluster. Thus, in the illustrative embodiment of the invention, Host 2's TCP/IP layer receives the ARP request packet and updates ARP table 413 during step 504 to include the ARP Source IP and the replacement ARP Source MAC address specified within the modified discovery request packet generated during step 502.

However, it is noted that step 504 represents an optimization rather than a necessity with regard to performing non-unicast address discovery within a cluster. First, in alternative embodiments the responding host, for any of a variety of reasons (security, reliability, etc.) does not update its address (e.g., ARP) table to include an entry specifying values corresponding to the dedicated physical address and IP address of the initiating host. However, the optimizing step 504 avoids the need for the responding host to perform such a request in the future—in the event that the responding host seeks to send an intracluster communication/request/response to the initiating host. Second, the non-unicast mode physical address that replaces the cluster address within the ARP Source MAC field need not be dedicated (i.e., uniquely assigned to each host within the cluster). In such case, the non-unicast mode address, potentially shared by all the hosts within the cluster, is utilized to ensure that a source/destination of a request differ. Upon receiving a packet including the non-dedicated address within the destination field, each host filters the packet based upon additional address information such as an IP address included within the packet.

In yet other embodiments of the invention the addresses are dedicated, yet they are not readily determined from the contents of an address discovery request. In embodiments of the invention where the dedicated physical address assigned to a particular host is not readily determined from the contents of the ARP request, the receiving host references a look-up table to establish a dedicated physical address that replaces the cluster address assigned to the identified initiating host within the ARP Source MAC field of the received discovery request. By way of example, the cluster host list 411 can be expanded to include a physical address corresponding to each IP address assigned to a host within the cluster. The cluster host list 411, in such instances, can be populated during configuration by an administrator (or during automated configuration supported by group policies).

Next, during step 506, in the illustrative example of the invention, the TCP/IP layer 412 of the responding Host 2 formulates an address discovery (e.g., ARP) response to the modified address discovery request forwarded by the NLB layer 410. The address discovery response packet formulated by the TCP/IP layer 412 operating in a unicast mode includes, as shown by way of example in row 620 of FIG. 6: a cluster address of the responding host within the Ethernet Source and ARP Source MAC, assigned IP addresses of the responding and initiating hosts within the ARP Source IP and APP Target IP, and the dedicated physical address of the initiating host (supplied by the NLB layer 410 during step 502 in the ARP request packet) within the Ethernet Destination and the ARP Target MAC. The TCP/IP layer 412, unaware of the previous changes made to the ARP request packet, passes the response packet back to the NLB layer 410.

Next, during step 508, after receiving the address discovery response from the TCP/IP layer 412, the NLB layer 410, recognizing an address discovery response to another cluster member (based upon the cluster host list 411) overwrites the cluster address (e.g., 02-bf-aa-bb-cc-dd) with a dedicated physical (e.g., multicast MAC) address corresponding to the NIC 408 of Host 2. The act of substituting the dedicated address for the cluster address supplied by the TCP/IP layer 412 enables Host 1 to discover the dedicated physical address of the responding Host 2 without taking the TCP/IP layer 412 out of its unicast mode of operation. In the illustrative embodiment of the invention, the NLB layer 410 overwrites the dedicated physical address specified in the ARP Target MAC field of the response packet with the cluster address of Host 1 to avoid rejection of the response by the TCP/IP layer 402 of the initiating Host 1. Thus, the latter substitution can occur at any point prior to passing the address discovery response packet back to the TCP/IP layer 402 of the initiating Host 2. In fact, in alternative embodiments of the invention, both substitutions described herein above are carried out by a component (e.g., the NLB layer 404) within the initiating Host 1 prior to passing the address discovery response to the TCP/IP layer 402.

The modified address discovery response packet is then transmitted via NIC 408 to the initiating Host 1. Since the Ethernet destination field contains the dedicated physical address, only Host 1 receives the response packet. During step 510, Host 1 receives the address discovery response, and the NLB layer 404 substitutes the cluster MAC address assigned to Host 1 for the dedicated physical address contained within the Ethernet Destination of the received response packet. An example of a response packet rendered by such substitution is summarized at row 640 of FIG. 6. The substitution during step 510 ensures that the TCP/IP layer 402, operating in a unicast cluster mode, will accept the address discovery response packet.

The NLB layer 404 passes the modified address discovery response packet depicted in row 640 to the TCP/IP layer 402. Upon receiving the response packet, the TCP/IP layer 402 adds the IP address (e.g., 12.12.4.102) and corresponding physical address (e.g., 03-bf-0c-0c-04-66) to an entry within the ARP Table 403. Thus, in the event that Host 1 needs to communicate with Host 2, such communications can be addressed specifically to Host 2 by designating the discovered physical address within its packets. An exemplary procedure for carrying out such communications is described herein below with reference to FIG. 7.

Finally, with regard to address discovery, it is noted that in an embodiment of the invention wherein complete dedicated physical address/IP address pairings are stored within each clustered host (e.g., within the cluster host lists 405 and 411). The NLB layer within each host includes a response synthesizer that generates and returns a response packet, of the type depicted in row 640, in response to an ARP request issued by the TCP/IP layer. In such instances, hosts do not rely upon received requests to update their ARP tables (e.g., during step 504). Instead, each TCP/IP layer of a clustered host issues an ARP request to determine and add the corresponding dedicated physical address of another host within a cluster.

Thus, in an alternative embodiment of the invention, a number of steps summarized in FIG. 5 are, for the most part, avoided. In their place, by way of example, the TCP/IP layer of the initiating host (e.g., Host 1) generates an address request and passes the request to the NLB layer (e.g., NLB layer 404). The NLB layer (or any other appropriate lower network communications component) detects the intracluster nature of the request (by reference to the ARP Target IP addresses). In response, the NLB layer synthesizes an ARP response based upon the ARP Target IP address. The response includes: a physical unicast cluster address within the Ethernet Source and Destination fields and the ARP Target MAC fields, swapped ARP Source and Destination IP addresses (in relation to the request), and a dedicated physical (multicast MAC) address within the ARP Source MAC field.

Referring now to FIG. 7, a set of steps are summarized that represent the series of modifications made to point-to-point intracluster messages transmitted, by way of example, between Host 1 and Host 2 after performing address discovery in accordance with the steps described herein above with reference to FIG. 6. Initially, during step 700, the TCP/IP layer 402 generates and sends an intracluster packet to Host 2. The intracluster packet includes, within the Ethernet destination field, the dedicated physical (e.g., multicast MAC) address of Host 2 obtained from the ARP table 403. The TCP/IP layer 402, operating in unicast mode, includes the unicast cluster address of the Host 1 within the Ethernet source field. However, the packet includes the unique IP address assigned to Host 1.

Next, during step 702 the responding Host 2, to which the transmitted packet was directed, receives the intracluster packet, corresponding to a request by Host 1. The intracluster nature of the received packet is detected by comparing the Ethernet destination MAC to the receiving host's dedicated multicast MAC address. If the MAC addresses match, then the receiving host replaces it with the cluster MAC address to ensure its acceptance by the TCP/IP layer. Alternatively, the intracluster nature of the received packet is detected by comparing the IP address specified in the Source IP address field to the list of IP addresses within the Cluster Host List 411. Upon detecting that the packet originated from a cluster member, the NLB layer 410 overwrites the dedicated physical address within the Ethernet destination field with the cluster address expected by the TCP/IP layer 412 of Host 2.

The server application 401 processes the request. During step 704 a response packet, corresponding to the received request is generated by the TCP/IP layer 412. In generating the response, the TCP/IP layer 412 references an entry (established, for example, during step 504) within the ARP table 413 corresponding to the source IP address specified in the request and obtains the dedicated multicast address of Host 1. The response generated by the TCP/IP layer 412 includes the cluster address within the Ethernet source field and the dedicated multicast address of Host 1 within the Ethernet destination field.

Next, during step 706, the NLB layer 404 of Host 1, by comparing the Ethernet destination MAC to the receiving host's dedicated multicast MAC address, detects the intracluster nature of the received packet. If the MAC addresses match, then the receiving host replaces it with the cluster MAC address to ensure its acceptance by the TCP/IP layer. Alternatively, the intracluster nature of the received packet is detected by comparing the Source IP address of the packet to entries within the cluster host list 405. Thus, before passing the received response packet to the TCP/IP layer 402, the NLB layer 404 substitutes the cluster MAC address for the dedicated multicast MAC address within the Ethernet destination field of the response packet. Such replacement avoids confusing higher level (e.g., TCP/IP) network communication functions on the receiving Host 1 that continue to operate within unicast mode—and therefore are expecting the cluster address in all received packets.

It is noted that while the above example uses dedicated physical addresses, the present invention is not so limited. In alternative embodiments of the invention, a non-unicast mode physical address is shared by a group of servers. However, the shared physical address is designated/understood by the NLB layer to indicate a point-to-point request and therefore initiates the above-described address substitutions that enable the NLB layers of clustered servers to support point-to-point communications while the TCP/IP layers remain in a unicast mode of operation that does not, by itself, support point-to-point intracluster communications.

It is further noted that the exemplary embodiment is provided with reference to ARP requests and responses that are associated with IPv4. However IPv6 includes analogous neighbor discovery protocols that advantageously incorporate the address re-writing steps disclosed herein. Also, differing mapping functions would likely be used in view of the larger number of bytes within an IPv6 address.

It will be appreciated by those skilled in the art that a new and useful method and framework for facilitating/performing point-to-point intracluster communications has been described herein. More particularly, the present invention enables network communications layer components within clustered hosts to operate in a cluster mode while enabling hosts to discover and use dedicated physical addresses to communicate point-to-point with other hosts within their cluster. In view of the many possible computing environments to which the principles of this invention may be applied and the flexibility of carrying out address discovery through inter-host communications, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for conducting physical address discovery, facilitating point-to-point communications between hosts of a cluster operating in a cluster mode wherein acceptable messages are addressed to a shared cluster address, the method comprising:

receiving by a target host, an address discovery request initiated by a source host seeking a physical address of the target host, wherein the source host and the target host are both hosts within the same cluster, wherein the target host is distinct from the source host and the target host comprises a network communication protocol-specific layer including an address discovery request handler that operates in the cluster mode; and generating by the target host, an address discovery response acceptable by the source host operating in the cluster mode, wherein the address discovery response comprises a response source physical address field specifying a non-cluster mode physical address of the target host, wherein the generating comprises:

determining by the target host whether the address discovery request was issued by a source host operating in the cluster mode, wherein the determining comprises:

detecting that the address discovery request includes a request source physical address field specifying the shared cluster address assigned to the cluster, and a request source network communication protocol-specific address field identifying the source host as a host within the cluster;

modifying the request source physical address field within the address discovery request, in accordance with the determining step, by replacing the shared cluster address with a non-cluster mode physical address of the source host;

passing the address discovery request to the address discovery request handler;

first creating an initial address discovery response, by the address discovery request handler, based upon the modified address discovery request, the address discovery response including:

the shared cluster address within the response source physical address field; and the non-cluster mode physical address of the source host within a response target physical address field; and second creating a revised address discovery response by:

first replacing the shared cluster address with the non-cluster mode physical address of the source host within the response source physical address field; and second replacing the non-cluster mode physical address of the source host with the shared cluster address within the response target physical address field.

2. The method of claim 1 wherein the second creating step is performed by the target host.

3. The method of claim 1 wherein the address discovery request handler maintains an address resolution table including a set of entries pairing network communication protocol-specific addresses with corresponding physical addresses, the method further comprising:

storing, by the address discovery request handler within the address resolution table, an entry including the non-cluster mode physical address and a corresponding network communication protocol-specific address of the source host.

4. The method of claim 1 wherein the network communication protocol-specific layer implements the TCP/IP protocol.

5. The method of claim 1 wherein the address discovery response further includes a response destination field specifying the shared cluster address assigned to the cluster, the method further comprising rendering the address discovery response acceptable by the source host operating in the cluster mode by:

replacing, within the response destination field, the non-cluster mode physical address with the shared cluster address.

6. A computer storage medium comprising computer-executable instructions for conducting physical address discovery, facilitating point-to-point communications between hosts of a cluster operating in a cluster mode wherein acceptable messages are addressed to a shared cluster address, the computer-executable instructions are executed by a processor to perform a method comprising:

receiving by a target host within the cluster, an address discovery request, initiated by a source host within the cluster, seeking a physical address of the target host, wherein the target host is distinct from the source host and the target host comprises a network communication protocol-specific layer including an address discovery request handler that operates in the cluster mode; and generating by the target host, an address discovery response acceptable by the source host operating in the cluster mode, wherein the address discovery response comprises a response source physical address field specifying a non-cluster mode physical address of the target host, wherein the generating comprises:

determining by the target host whether the address discovery request was issued by a source host operating in the cluster mode, wherein the determining comprises:

detecting that the address discovery request includes a request source physical address field specifying the shared cluster address assigned to the cluster and a request source network communication protocol-specific address field identifying the source host as a host within the cluster;

modifying the request source physical address field within the address discovery request, in accordance with the determining step, by replacing the shared cluster address with a non-cluster mode physical address of the source host;

passing, after the replacing step, the address discovery request to the address discovery request handler;

first creating an initial address discovery response, by the address discovery request handler, based upon the modified address discovery request, the address discovery response including:

the shared cluster address within the response source physical address field; and the non-cluster mode physical address of the source host within a response target physical address field; and second creating a revised address discovery response by:

first replacing the shared cluster address with the non-cluster mode physical address of the source host within the response source physical address field, and second replacing the non-cluster mode physical address of the source host with the shared cluster address within the response target physical address field.

7. The computer storage medium of claim 6 wherein the second creating step is performed by the target host.

8. The computer storage medium of claim 6 wherein the address discovery request handler maintains an address resolution table including a set of entries pairing network communication protocol-specific addresses with corresponding physical addresses, the method further comprising:

storing, by the address discovery request handler within the address resolution table, an entry including the non-cluster mode physical address and a corresponding network communication protocol-specific address of the source host.

9. The computer storage medium of claim 6 wherein the network communication protocol-specific layer implements the TCP/IP protocol.

10. The computer storage medium of claim 6 wherein the address discovery response further includes a response destination field specifying the shared cluster address assigned to the cluster, the method further comprising:

rendering the address discovery response acceptable by the source host operating in the cluster mode by replacing, within the response destination field, the non-cluster mode physical address with the shared cluster address.

11. A host computer system including physical address discovery components facilitating point-to-point communications between hosts of a cluster operating in a cluster mode wherein acceptable messages are addressed to a shared cluster address, the host computer system comprising: a source host and a target host;

a network interface, on the target host, for receiving an address discovery request initiated by the source host within the cluster, seeking a physical address of the target host within the cluster;

a transport layer component for carrying out transport-protocol specific processing of network requests, wherein the transport layer component includes an address discovery request handler that operates in the cluster mode; and intracluster address discovery logic interposed between the network interface and the transport layer component of the host computer system, the intracluster address discovery logic performing the step of:

generating an address discovery response acceptable by the source host operating in the cluster mode and including:

a response source physical address field specifying a non-cluster mode physical address of the target host;

determining whether the address discovery request was issued by the source host operating in the cluster mode, wherein the determining step performed by the intracluster address discovery logic comprises:

detecting that the address discovery request includes a request source physical address field specifying the shared cluster address assigned to the cluster, and a request source network communication protocol-specific address field identifying a host within the cluster of hosts;

modifying the request source physical address field within the address discovery request, in accordance with the determining step, by replacing the shared cluster address with a non-cluster mode physical address of the source host;

passing the address discovery request to the address discovery request handler;

first creating an initial address discovery response, by the address discovery request handler, based upon the modified address discovery request, the address discovery response including:

the shared cluster address within the response source physical address field; and the non-cluster mode physical address of the source host within a response target physical address field; and second creating a revised address discovery response by:

first replacing the shared cluster address with the non-cluster mode physical address of the source host within the response source physical address field, and second replacing the non-cluster mode physical address of the source host with the shared cluster address within the response target physical address field, wherein the host computer system is one of the hosts of the cluster operating in the cluster mode.

12. The host computer system of claim 11, wherein the address discovery request handler maintains an address resolution table including a set of entries pairing network communication protocol-specific addresses with corresponding physical addresses, and wherein the address discovery request handler stores, within the address resolution table, an entry including the non-cluster mode physical address and a corresponding network communication protocol-specific address of the source host.

13. The host computer system of claim 11 wherein the transport layer component implements the TCP/IP protocol.

* * * * *